United States Patent [19]

Parks

[11] 4,097,745

[45] Jun. 27, 1978

[54] HIGH RESOLUTION MATRIX LENS ELECTRON OPTICAL SYSTEM

[75] Inventor: Harold G. Parks, Scotia, N.Y.

[73] Assignee: General Electric Company, Schenectady, N.Y.

[21] Appl. No.: 732,019

[22] Filed: Oct. 13, 1976

[51] Int. Cl.[2] ................................................ G01K 1/08

[52] U.S. Cl. ................................ 250/398; 250/396 R; 313/431

[58] Field of Search ................. 250/398; 313/429, 431

[56] References Cited

U.S. PATENT DOCUMENTS

| | | | |
|---|---|---|---|
| 3,371,206 | 2/1968 | Takizawa | 250/398 |
| 3,651,303 | 3/1972 | Rehme | 250/492 A |
| 3,876,883 | 4/1975 | Broers | 250/398 |
| 3,936,693 | 2/1976 | Parks et al. | 313/429 |

*Primary Examiner*—Harold A. Dixon
*Attorney, Agent, or Firm*—Geoffrey H. Krauss; Joseph T. Cohen; Marvin Snyder

[57] ABSTRACT

A high resolution matrix lens electron optical system utilizes a relatively short focal length matrix lens, means for providing an axial magnetic field and electrostatic deflection means for both coarse and fine deflection operation in conjunction with the axial magnetic field to provide reduced cathode loading and minimal spherical aberration.

14 Claims, 4 Drawing Figures

30

HIGH RESOLUTION MATRIX LENS ELECTRON OPTICAL SYSTEM

BACKGROUND OF THE INVENTION

The present invention relates to electron optical systems and more particularly to a novel high resolution matrix lens electron optical system utilizing mixed electrostatic and magnetic deflection fields with a relatively short focal length matrix lens.

Known matrix lenses, such as are used in integrated circuitry art-work-master cameras and electron beam addressed computer memories, may utilize a lens system such as is shown in U.S. Pat. No. 3,936,693 entitled "Two Aperture Immersion Lenses", issued Feb. 3, 1976 and assigned to the assignee of the present invention. The matrix lens therein, utilized to provide a scannable focussed beam of electrons impinging upon a target plane, is of the long-focus type, i.e., the geometric center of each lenslet aperture of the matrix lens is spaced from the target by a distance on the order of at least 20 lenslet diameters. Spherical aberration is known to be the limiting aberration in matrix lens applications; the coefficient of spherical aberration increases with increasing lens-to-target mid-focal-length distance, whereby the minimal value of spherical aberration coefficient is not achieved with long-focus lenses. The relatively large distance between matrix lens and target plane (and hence mid-focal-length distance) is necessitated by the use of fine deflection means, such as the orthogonally disposed fine deflection bars disclosed (as elements 36 and 40) in U.S. Pat. No. 3,534,219, entitled "Cascaded Electron Optical System", issued Oct. 30, 1970 and assigned to the assignee of the present invention, which fine deflection bars limit the minimum distance between a matrix lens and its associated target, thereby establishing a relatively large minimum coefficient of spherical aberration realizable in a matrix lens optical system.

BRIEF SUMMARY OF THE INVENTION

In accordance with the invention, a high resolution matrix lens electron optical system, overcoming the above-mentioned problems, comprises a single fine deflection means, such as a deflectron, positioned between a matrix lens means, such as the two aperture immersion lens hereinabove mentioned, and the memory target plane. Means for forming a magnetic field of substantially constant magnitude essentially axially in the electron beam system enables focussing of the electron beam, entering each lenslet of the matrix lens, at the entrance end of the fine deflection means to achieve a relatively short focal length thereby decreasing the coefficient of spherical aberration. The finely focussed beam leaving each lenslet is subjected to a combination of electrostatic and magnetic deflection (responsive to the axial magnetic field), to facilitate scanning of the finely focussed beam over the required portion of the target plane, when the length of the fine deflection means is selected to cause the electron beam to trace an integral number of cycloids in the crossed-field region therein.

In a preferred embodiment, the axial magnetic field extends a sufficient distance from the matrix lens means, in the direction away from the target, to facilitate crossed-field deflection of the initially-axially-aligned electron beam to a selected one of a two-dimensional array of lenslets in the matrix lens, by coarse deflection means requiring only an electrostatic input.

Accordingly, it is one object of the present invention to provide a novel high resolution matrix lens electron optical system.

It is another object of the present invention to provide a novel matrix lens electron optical system having a minimum coefficient of spherical aberration.

These and other objects of the present invention will become apparent upon a consideration of the following detailed description and the accompanying drawings.

DETAILED DESCRIPTION OF THE INVENTION

Figure 1:
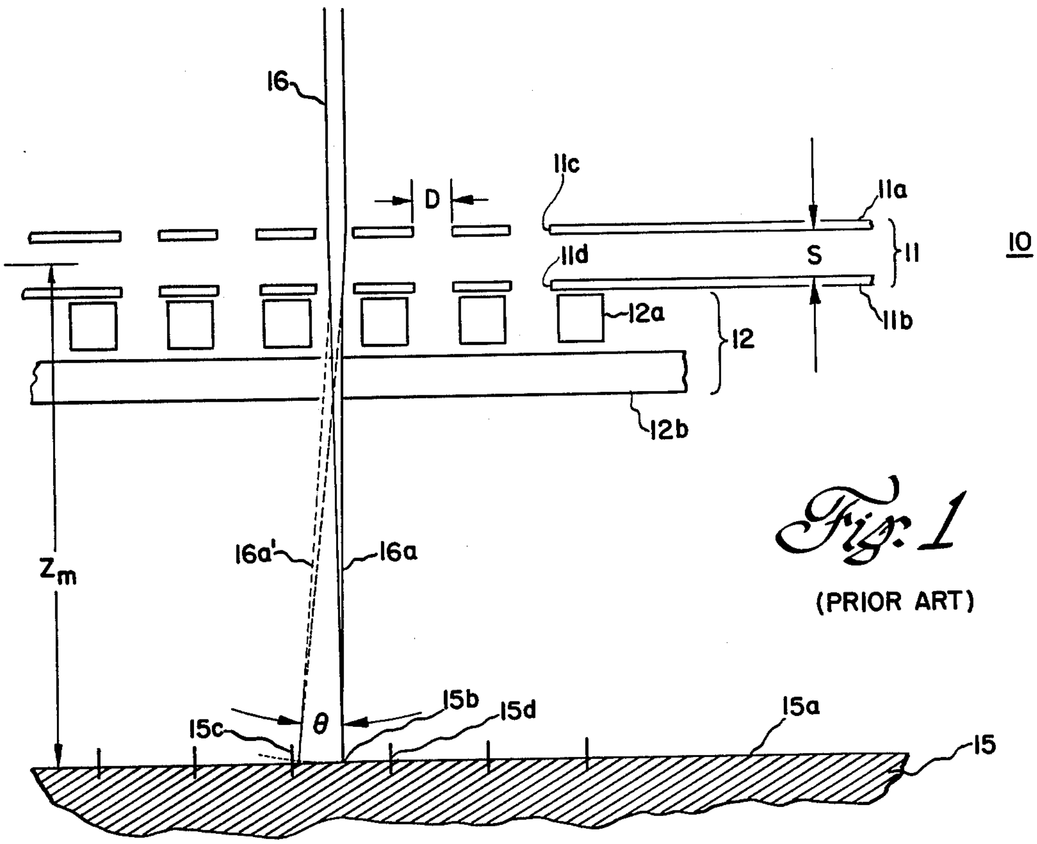
Fig. 1 (PRIOR ART)
FIG. 1 is a side view of a prior art arrangement utilizing a two aperture immersion lens and orthogonally-disposed fine deflection means.
Figure 2:
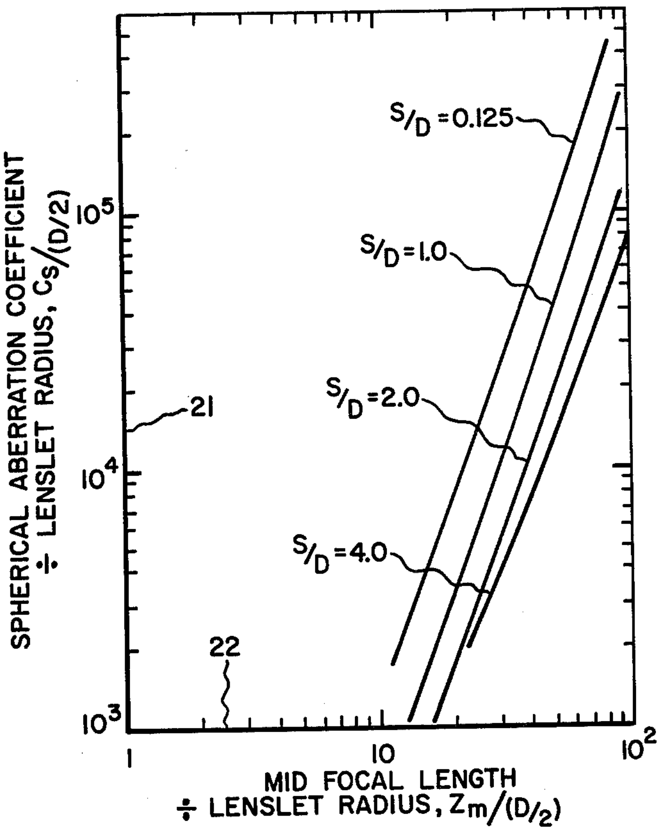
FIG. 2 is a graph illustrating the relationship between normalized spherical aberration coefficient and mid-focal length for a matrix lens system.

Referring initially to FIGS. 1 and 2, prior art matrix lens optical system 10 comprises an electron matrix lens means 11, typically comprising a pair of plates 11*a* and 11*b* having a spacing distance S therebetween and having a two-dimensional array of apertures 11*c* and 11*d*, respectively, formed with diameter D and in registration therethrough. A fine deflection means 12 comprising a two-dimensional array of mutually orthogonal sets of parallel deflection bars 12*a* and 12*b* is arranged above the surface 15*a* of a memory target plane 15, with the central plane of the matrix lens 11 being maintained at a selected mid-focal-length distance $Z_m$ above and parallel to target surface 15*a*. Electron beam 16 is scanned to a selected lenslet (lens aperture set) and is, in the absence of action by fine deflection means 12, focussed by lens 11 essentially to a spot, of diameter on the order of 1 micron, at the center position 15*b* of a scanning field (defined by limit positions 15*c* and 15*d* in a one-dimensional drawing representation as illustrated herein) on target surface 15*a*. Energization of fine deflection means 12 with a variable magnitude of fine deflection voltage will cause a focussed portion 16*a* of the beam to be deflected, as beam 16*a'*, to impinge upon a chosen spot positioned within the deflection field defined for each lens (the focussed beam 16*a'* being shown deflected to a left-most spot at position 15*c*, by the application of suitable deflection potential to deflection bars 12*a*). As matrix lens means 11 images an on-axis object e.g. the beam emitted from the aperture of the cathode of emitter means 32 (see FIG. 3), the spherical aberration on the final size of the spot, as at point 15, is proportional to the square root of the spherical aberration coefficient $C_S$ of the matrix lens means. Therefore, the current density of the beam at the target surface 15*a* is maximized when the matrix lens means achieves the smallest possible value of spherical aberration.

As seen in FIG. 2, wherein a spherical aberration coefficient $C_S$, normalized to the lenslet radius (D/2), is plotted for increasing values along logarithmically-scaled ordinate 21, and mid-focal-length $Z_M$, also normalized to lenslet radius, is plotted for increasing values along logarithmically-scaled abscissa 22, a matrix lens 11 having a given ratio of lens plate spacing S to lenslet diameter D has an increasing coefficient of spherical aberration with an increase in lens-to-target distance (mid-focal-length $Z_M$). Thus, spherical aberration, being the limiting aberration in matrix lens applications, requires a lens having as short a focal length as possible. In the prior art (FIG. 1), the distance $Z_M$ has a certain minimum value established by the requirement of positioning fine deflection means 12, of some given thickness, between lens 11 and target 15, as well as by the conflicting requirement for maximizing distance $Z_M$ whereby the maximum deflection angle $\theta$ is minimized (for a scan over the same target block, defined by end limits 15*c* and 15*d*) to facilitate fine deflection of beam 16*a* to any point within its scannable range at electronic rates, typically on the order of 10,000,000 changes in beam-impingement-point per second.

Figure 3:
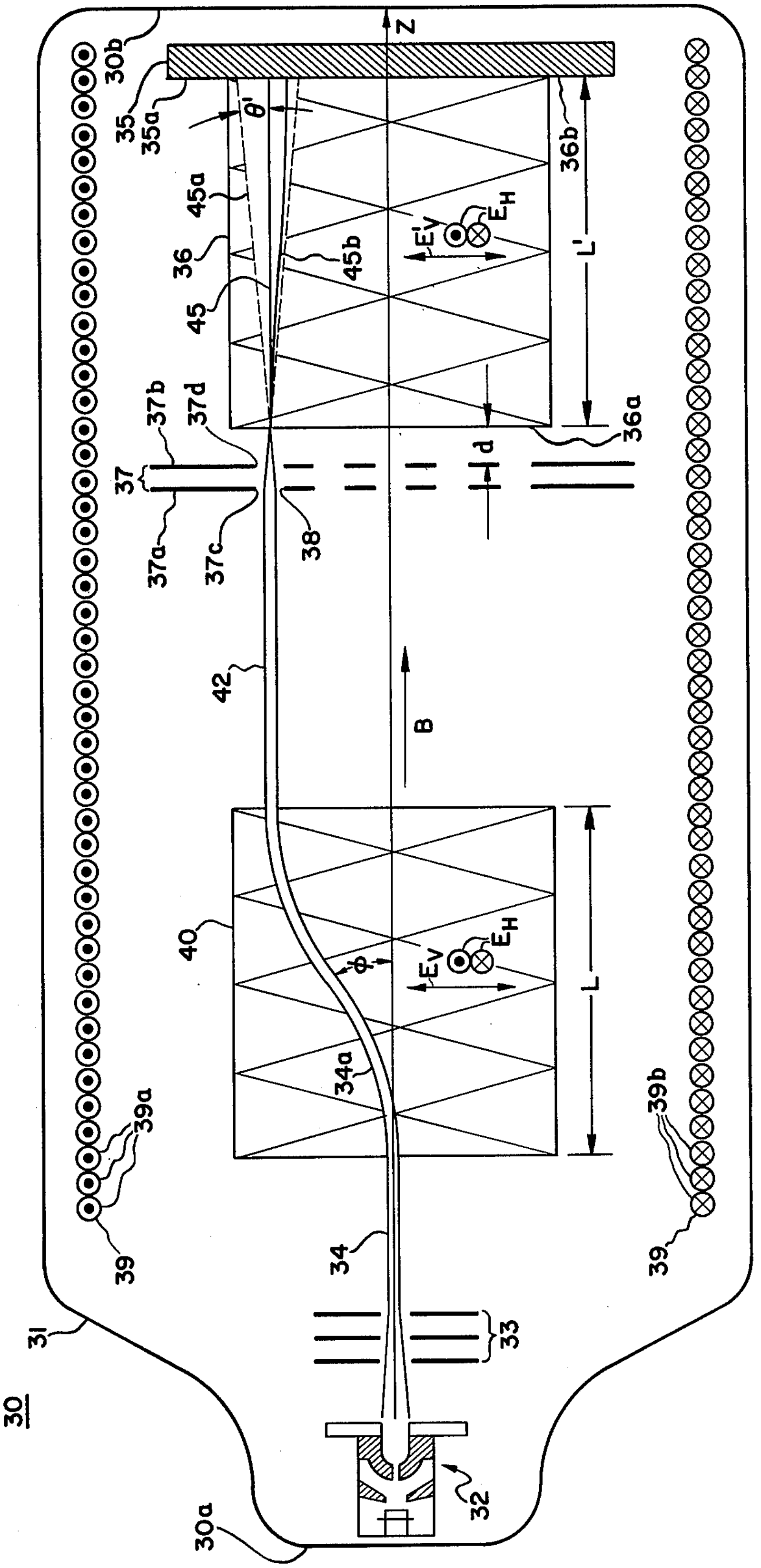
FIG. 3 is a schematic side view of a novel high resolution matrix electron optical system in accordance with the principles of the present invention.
Figure 3A:
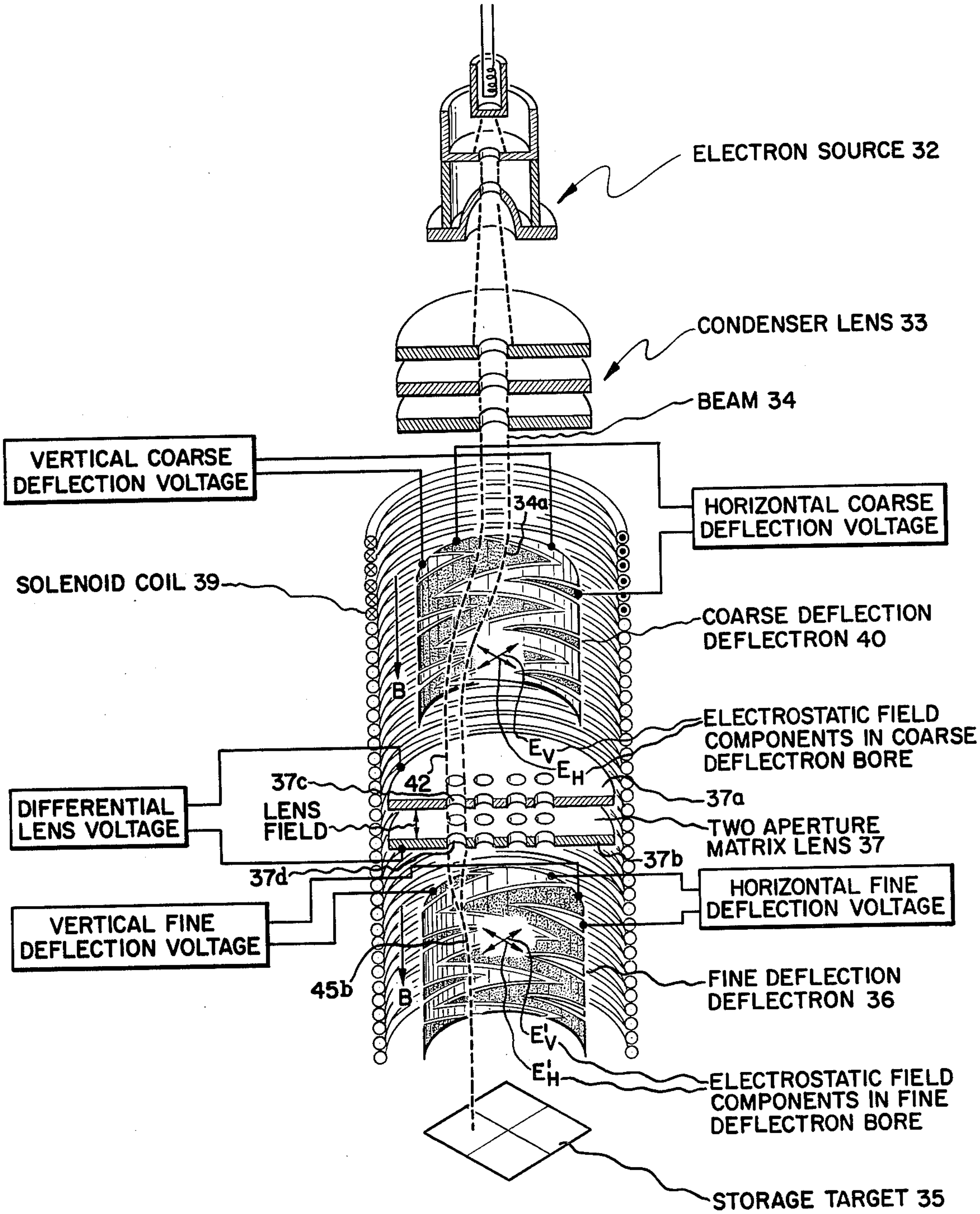
FIG. 3*a* is a perspective axial system of the high resolution matrix electron optical system of FIG. 3

Referring now to FIGS. 3 and 3*a*, a high resolution matrix lens electron optical system is illustrated as being utilized in an electron beam computer memory tube 30, although other apparatus will utilize the electron beam optical system of the present invention to equal advantage. The tube comprises envelope means 31 for supporting the various elements, hereinafter described, in an environment of substantially reduced pressure i.e., a "vacuum" tube. An electron source means 32, positioned at a first end 30*a* of the tube, emits a stream of electrons which is collimated by a condenser lens means 33 into a narrow beam 34 directed along the central Z axis of the optical system toward target means 35 positioned essentially transverse to the Z axis adjacent the opposite end 30*b* of the tube. An axially aligned fine deflection means 36 is positioned adjacent to, and preferably substantially in abutment with, that surface 35*a* of target means 35 facing source means 33. An electron lens means 37 is positioned essentially transverse to the Z axis at a selected, relatively short distance *d* from the end 36*a* of fine deflection means 36 furthest from target means 35. Lens means 37 may, in one preferred embodiment, comprise a pair of plates 37*a* and 37*b* each having an array of apertures 37*c* and 37*d*, respectively, formed therethrough essentially in axial alignment with each other and with their central aligned axes parallel to the central Z axis of the electron beam system. Each set of apertures 37*c* and 37*d* define a single lenslet 38 of construction and operation as more fully explained in the above-mentioned U.S. Pat. No. 3,936,693.

A solenoid-wound coil 39 has its conductors radially positioned beyond the boundaries of target means 35, fine deflection means 36 and lens means 37, with the coil axis coincident with the system Z axis. Coil 39 is energized to have an electric current flowing therethrough in the directions indicated by arrowheads 39*a* (current flowing out of the plane of the drawing at the uppermost portions thereof) and arrowtails 39*b* (current flowing into the plane of the drawing at the lowermost portions thereof), whereby a magnetic field of magnitude $B_O$ in a direction as shown by arrow B, i.e., an axial magnetic field in the Z direction, is generated in tube 30.

The axially-directed beam 34 of electrons leaves collimating means 33 and enters a coarse deflection means 40, which means is generally axially aligned along the central Z axis. The beam is initially deflected radially away from the Z axis, at an angle $\theta$, upon entering coarse deflection means 40, by the force generated upon the electrons of the beam responsive to both the axial magnetic field and a simultaneous electric field E generated within coarse deflection means 40, which may be a deflectron and the like, responsive to application thereto of deflection voltages of proper magnitude and polarity, in manner known to the art. As seen in FIG. 3, the electric field E is composed of a first amplitude horizontal field component $E_H$ and a second amplitude vertical field component $E_V$, where the first and second amplitudes are selected to cause beam 34 to be deflected within means 40 to a desired one of lenslets 38. The deflected beam 34*a* will follow a cyclic path in the combined electric and magnetic fields; the effective length L of coarse deflection means 40 is selected to cause beam 34*a* to trace out an integral number of cycloids within deflection means 40 (a single cycle path being shown in FIG. 3) and to emerge therefrom as a beam 42 which is directed both parallel to the central Z axis and is radially spaced therefrom, in the direction determined by the magnitude and direction of the E field, to impinge upon selected lenslet 38. It should be understood that the coarse deflection means 40 may be any suitable means for radially deflecting beam 34 to a desired distance and direction radially disposed from the central Z axis; the above-described deflectron, immersed in the constant axial magnetic field, formed by extending coil means 39 away from the region bounded by lens means 37 and target means 35 to include the region wherein coarse deflection means 40 is situated, is preferable as both fine deflection means 36 and coarse deflection means 40 may be of the same diameter and physical construction, minimizing the complexity and cost of the electron optical system.

Plates 37*a* and 37*b* of lens means 37 have a voltage of suitable polarity and relative magnitude impressed therebetween to generate an electric field of relatively high magnitude between the plates, whereby the electrons of beam 42 entering the selected lenslet 38 are focussed essentially to a point at the plane defining the effective input of line deflection means 36, where fine deflection activity commences. Thus, each lenslet 38 has an extremely short focal length, equal to the relatively short distance *d* (on the order of one-half to three times the lenslet diameter) separating the rear-most plate 37*b* and the plane defining the forward end 36*a* of the fine deflection means. As the focal length is relatively short, the high electric field of lens means 37 has a dominating influence, over the axial magnetic field, on the beam in this region whereby a demagnified image of the object aperture is formed at the relatively very short distance *d* from the exit plane of the matrix lens. In the presence of zero magnitude deflection voltages applied to fine deflection means 36, the finely focussed spot is relayed without deflection as a finely focussed beam 45 of electrons to impinge essentially normal to target plane surface 35*a*, as the forward velocity vector of the electrons is parallel to the magnetic field vector, whereby zero radial force is generated by the $\bar{V}\times\bar{B}$ interaction. For non-zero deflection voltages applied to fine deflection means 36, the focussed point source appears exactly in the plane of input end 36*a* of the lens and is deflected as a beam 45*a*, illustrated in broken line, through some deflection angle up to and including the desired maximum deflection angle $\theta'$ required to scan the full field of target plane 35 associated with a selected lenslet, responsive to the force generated upon the electrons of the beam responsive to interaction thereof with the simultaneous axial magnetic and transverse electric E' fields ($E'_V$ and $E'_V$ respectively in the vertical and horizontal directions) within the region defined by the annular body of fine deflection means 36. The length L' of fine deflection means 36 is selected, as mentioned hereinabove with reference to the length L of coarse deflection means 40, to cause the cyclically oscillating beam 45 to trace out an integral number of cycloids between input plane 36*a* and output plane 36*b* of the fine deflection means, e.g. deflected beam 45*b* tracing a single cycle in FIG. 3. Thus, the beam, initially focussed on the input plane of the fine deflection means, is delayed therethrough and appears at the output end (target plane surface 35*a*) without appreciable divergence, i.e., focussed to a point, and with unity magnification, but with a radial deflection from the center of the target field and with a velocity vector again parallel to the central axis. In this manner, the orthogonally oriented sets of parallel deflection bars 12 (FIG. 1) are not required and the transverse electric fields of the fine deflection means 36, in conjunction with the axial magnetic field, cause the electron beam from each lenslet to be scanned to a selected point with the target field of that lenslet, and to be essentially focussed thereat. It should be emphasized that, because the annular portions of fine deflection means 36 are at greater distances than the radial distance of any of lenslet 38 from the Z axis, a substantially uniform fine deflection of the focussed beam 45 emerging from any lenslet 38 across the entire plane of lens means 37 is achieved with the single fine deflection means 36. Thus, a set of orthogonal fine deflection bars, requiring costly manufacturing and alignment processes, is not required and the deflection of the electron beam from each lenslet is substantially uniform and is of minimal spherical aberration, as the mid-focal-length is now the distance *d* and the normalized value thereof is between about 1 and about 6 (for *d* being between about D/2 and 3D). Hence, greater beam convergence angle and a higher beam current at a smaller spot diameter can be achieved with the apparatus of the present invention. I have found that beam current may be increased by an order of magnitude with constant cathode loading for a given spot size, or, alternatively, cathode loading (in source means 32) may be reduced by a factor of up to ten times to extend the lifetime of the cathode by a similar factor while maintaining constant beam current. Further, removal of the fine deflection bars 12*a* and 12*b* (FIG. 1), which bars have a finite thickness and width, allows the spacing between lenslet central axes to be decreased to narrow the lenslet field of view and impose less stringent stability requirements upon the electron optical system for a spot of the same size at the target or to facilitate a decrease in spot diameter without excessively increasing stability requirements. Preferably, a cylindrical deflectron, rather than the more commonly used deflectrons of conical shape (the latter being of greater cost and manufacturing complexity), can be utilized without sacrificing mechanical stability. It should be understood that either an accelerating or a decelerating type of matrix lens means 37 may be utilized, with a decelerating lens being preferably to further reduce the aberrations in the electron optical focussing system, while allowing use of a single lenslet select deflectron (coarse deflectron means 40) with only electrostatic drive for higher deflection speed and superior containment of the deflecting fields.

While the present invention has been described with reference to one preferred embodiment thereof, many other variations or modifications will now become apparent to those skilled in the art. It is my intent, therefore, to be limited not by the scope of the present disclosure herein, but only by the scope of the appending claims.

What is claimed is:

1. An electron optical system for use in deflecting a beam of collimated electrons emitted by source means along an axis of said optical system toward a surface of target means spaced from said source means, comprising:

electron lens means positioned along said system axis between said source and target means and having an array of a plurality of lenslets each adapted for focussing a beam of electrons impinging thereon substantially to a point at a selected distance beyond said lens means toward said target means;

first means for forming a magnetic field of substantially constant amplitude essentially along said system axis at least between said lens and target means;

first deflection means for selectably deflecting said electron beam axially emitted from said source beam to illuminate a selected one of said plurality of said lenslets; and second deflection means positioned between said lens and target means for relaying and deflecting the focussed beam of electrons to a selected impact site upon said target means surface responsive to the magnitude and polarity of a variable electric field and to said axial magnetic field contained within said second deflection means.

2. An electron optical system as set forth in claim 1, wherein said first means also forms said axial magnetic field along at least a portion of the axis between said source and lens means, said first deflection means being positioned to contain said axial magnetic field and adapted to generate an electrostatic field therein in a plane essentially transverse to said magnetic field to deflect the initially axial electron beam to the selected lenslet by interaction of the electrons with said beam with both said electrostatic field and said axial magnetic field.

3. An electron optical system as set forth in claim 2, wherein said first deflection means is a deflectron.

4. An electron optical system as set forth in claim 3, wherein said deflectron is a cylindrical deflectron having an axis disposed essentially along said system axis.

5. An electron optical system as set forth in claim 3, wherein said deflectron has an effective axial length selected to cause an electron beam passing therethrough to trace essentially an integral number of cycloids therein and emerge therefrom parallel and selectably radially spaced from said system axis.

6. An electron optical system as set forth in claim 1, wherein said first means is a solenoid-wound coil means radially positioned around at least said lens, second deflection and target means; said coil means having a current flowing therethrough of magnitude and polarity selected to generate said axial magnetic field of a desired magnitude and direction.

7. An electron optical system as set forth in claim 1, wherein said lens means comprises a pair of parallel plates disposed substantially transverse to said system axis, each plate having an array of apertures formed therethrough in registration with corresponding apertures formed in an array formed through the other plate; said plates being adapted to have a differential voltage impressed therebetween to cause each set of registered apertures to act as a lenslet for focussing an impinging electron beam substantially to a point at said selected distance beyond said lens means toward said target means.

8. An electron optical system as set forth in claim 1, wherein said second deflection means has an effective input plane located between said lens target means at said selected distance from said lens and means, said first deflection means being adapted to generate an electrostatic field therein in a plane essentially transverse to said system axis to deflect said focussed beam of electrons by interaction thereof with both said electrostatic field and said axial magnetic field.

9. An electron optical system as set forth in claim 8, wherein said second deflection means has an output plane adjacent said surface of said target means.

10. An electron optical system as set forth in claim 8, wherein said second deflection means has an output plane essentially in abutment against said surface of said target means.

11. An electron optical system as set forth in claim 8, wherein said second deflection means is another deflectron.

12. An electron optical system as set forth in claim 11, wherein said another deflectron is a cylindrical deflectron having an axis disposed essentially along said system axis.

13. An electron optical system as set forth in claim 11, wherein said another deflectron has an effective axial length selected to cause a focussed electron beam passing therethrough to trace essentially an integral number of cycloids therein and to emerge therefrom as a similarly focussed electron beam both parallel to and selectably radially spaced from a direction of impingement of said beam upon the input plane of said deflectron.

14. An electron optical system as set forth in claim 1, further comprising means for maintaining a substantial vacuum in a region traversed by said electron beam at all deflection positions thereof.

* * * * *